Figure 1:
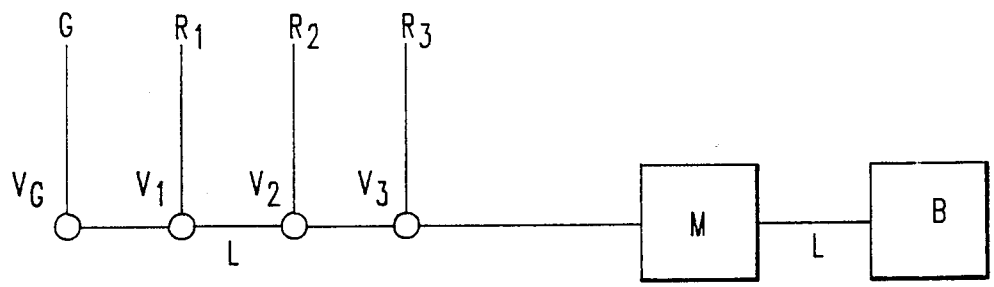

United States Patent [19]

Lindenbaum et al.

[11] Patent Number: 5,224,387
[45] Date of Patent: Jul. 6, 1993

[54] ARRANGEMENT FOR FLOW MEASUREMENT

[75] Inventors: Herbert Lindenbaum, Steinfurt; Klaus Räckers, Sendenhorst; Wolfgang Hohne, Münster, all of Fed. Rep. of Germany

[73] Assignee: BASF Lacke + Farben AG, Münster, Fed. Rep. of Germany

[21] Appl. No.: 423,432

[22] PCT Filed: Mar. 25, 1988

[86] PCT No.: PCT/EP88/00252

§ 371 Date: Nov. 29, 1989

§ 102(e) Date: Nov. 29, 1989

[87] PCT Pub. No.: WO88/07662

PCT Pub. Date: Oct. 6, 1988

[30] Foreign Application Priority Data

Mar. 31, 1987 [DE] Fed. Rep. of Germany ....... 3710682

[51] Int. Cl.$^5$ .............................................. G01F 1/84
[52] U.S. Cl. .................................... 73/861.37; 73/198
[58] Field of Search ............... 73/198, 861.04, 861.37, 73/861.38; 364/510

[56] References Cited

U.S. PATENT DOCUMENTS 3,425,274  2/1969  Clement et al. .................... 73/194
4,192,184  3/1980  Cox et al. ......................... 73/861.38
4,911,006  3/1990  Hargarten et al. .................. 73/198

FOREIGN PATENT DOCUMENTS 0011787  6/1980  European Pat. Off. .
2166681  8/1971  Fed. Rep. of Germany .
2511234  9/1975  Fed. Rep. of Germany .
2569844  3/1986  France .

*Primary Examiner*—Herbert Goldstein
*Attorney, Agent, or Firm*—Kenyon & Kenyon

[57] ABSTRACT

An apparatus for measuring fluid flow has a measuring device operating in accordance with the Coriolis principle. The measuring device has an oscillating conduit wherein the fluid to be measured flows through the conduit, and a sensor for sensing the movement of the conduit and generating output signals indicative of the movement. The measuring device generates a measurement signal based on the sensor signal indicative of the flow rate of fluid through the conduit. A counting device is coupled to the measuring device for receiving the measurement signal and calculating the flow rate of fluid through the conduit based on the measurement signal. An error-detecting device is coupled to the measuring device and to the counting device for comparing the measurement signal to a threshold value, and if the measurement signal exceeds the threshold value, the error-detecting device interrupts the transmission of the measurement signal to the counting device and transmits a predetermined measurement signal to the counting device.

3 Claims, 2 Drawing Sheets

TIME
START OF METERING

TIME
END OF METERING

ARRANGEMENT FOR FLOW MEASUREMENT

The invention relates to an arrangement for flow measurement.

Mass flow measuring arrangements are known which operate by means of a tube through which the fluid to be measured flows and which is set into resonant oscillation, the mass flowing through being calculated from phase shifts within this tube. The measuring inaccuracies of these arrangements become undesirably great when a heterogeneous two-phase mixture flows through the metering tube. If the measuring arrangement is installed in a line through which various fluids are pumped and if the line is in each case purged with a gas between these fluids, heterogeneous zones occur at the beginning and at the end of each fluid metering in which zones this fluid is mixed together with a part of the purge gas.

The invention has the object of minimizing the measuring inaccuracies during the time in which a heterogeneous two-phase mixture flows through the metering tube.

During the time in which a recognizable false measurement is provided by the mass flow measuring instrument, the measuring error is to be reduced by analyzing an artificially generated signal instead of the faulty measurement signal.

Figure 2:
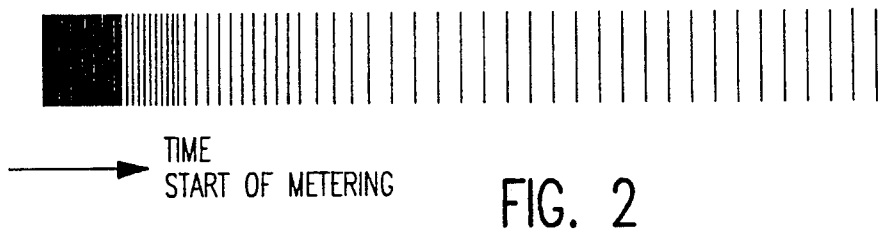
Figure 3:
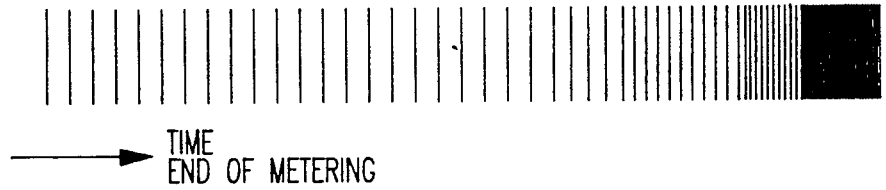
Figure 4:
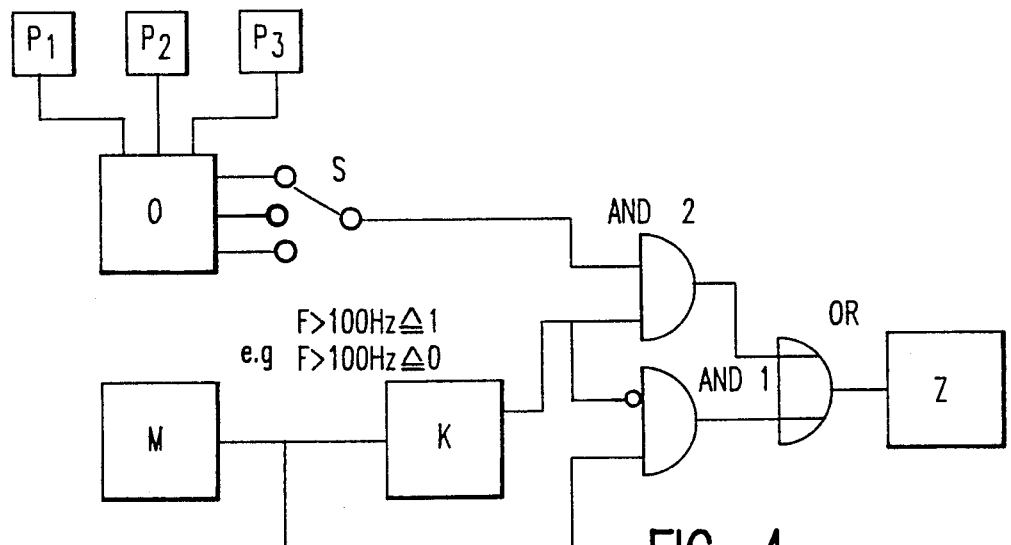
Figure 5:
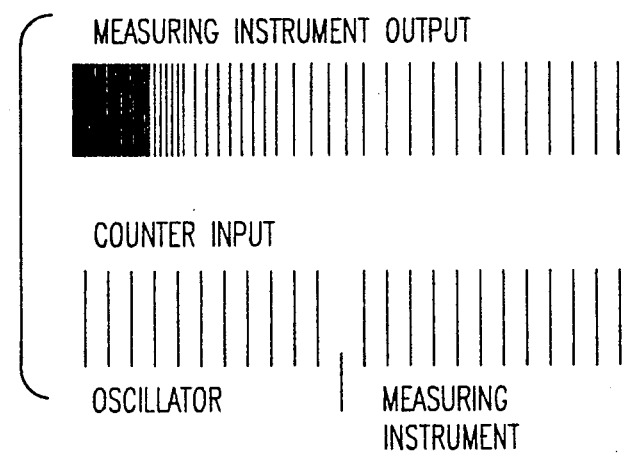
Figure 6:
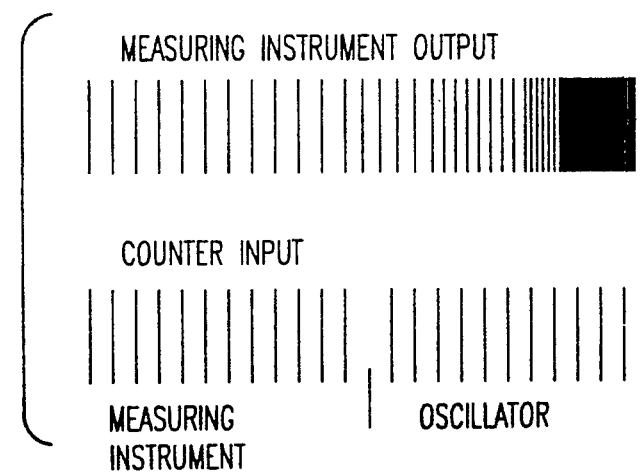

In the text which follows, an illustrative embodiment of an arrangement for mass flow measurement according to the invention is described and explained with reference to the drawings, in which:

FIG. 1 shows a basic diagram of a system in which the arrangement for mass flow measurement is used, FIG. 2 shows a measurement signal at the starting time of a metering, FIG. 3 shows the measurement signal from FIG. 2 at the end of the metering, FIG. 4 shows a basic circuit diagram of the error correction circuit within the arrangement for mass flow measurement, FIG. 5 shows a comparison of the signal output by the measuring instrument with the signal received by the counter, during the starting time of a metering and FIG. 6 shows a comparison as in FIG. 5 but at the end of the same metering.

In FIG. 1, B identifies a container which can be supplied with various raw materials R1, R2, R3 via a line L. Between the feed lines for the raw materials and the container B an arrangement for mass flow measurement M is provided. Apart from the raw materials,R the container B can also be supplied with purge gas G via line L. This purging occurs after each metering during which a particular raw material R is pumped into the container B. The extent of each metering or purging, respectively, is determined by opening and closing valves V1, V2, V3 for the raw materials and Vg for the purge gas.

The measuring instrument Mg within the arrangement for mass flow measurement M exhibits an output signal in the form of pulses, the frequency of which changes with the mass flow through the measuring instrument. In this arrangement, frequency increases with mass.

During the beginning of a metering, initially only the purge gas is present in the metering tube of the arrangement for mass flow measurement. Subsequently, when the raw material R flows through the metering tube, a heterogeneous two-phase mixture of purge gas and raw material is present for a particular time in the metering tube and during this time, the pulses emitted by the measuring instrument do not correspond to the actual mass flow. This can be clearly seen from FIG. 2: at the beginning of the metering, that is to say of the pumping process for the raw material R, the measuring signals have a very high frequency and thus indicate a flow of a great amount of mass, whereas the signal later settles at a value which characterizes a lower mass flow. At the beginning of the metering, however, the mass flow cannot yet be as great as later since, especially at the beginning, the raw material R does not yet fully flow through the line and the metering tube because there is still purge gas in these lines.

At the beginning of metering, the high-frequency measurement signals partly reproduce capacities which cannot even be produced by the pump used.

FIG. 3 illustrates that a similar phenomenon can be observed at the end of metering. Here, too, the measurement signal simulates a much greater mass than the mass actually flowing through.

It is true that the false measurements at the beginning and the end of a metering are only within the range of seconds, but the smaller the quantity to be metered, the greater the effect of this error, so that a minimization of this error is therefore desirable.

The correction circuit enabling this error minimization to be performed is shown in FIG. 4. In this figure, Mg designates the measuring instrument within the arrangement for mass flow measurement which provides a measurement signal for the counter Z. Since this measurement signal, as can be seen from FIGS. 2 and 3, consists of pulses, the measuring instrument output is followed by a frequency comparator K which provides a signal path for the measurement pulses to the counter Z if the frequency of these measurement pulses is within the tolerance range. The tolerance range can be predefined, for example, by the fact that only frequencies corresponding to a delivery quantity up to the maximum capacity of the pump connected are analyzed.

If a false measurement becomes apparent by the fact that the output signals of the measuring instrument exhibit a frequency which is outside the delivery capability of the pump connected, a signal synthetically generated by an oscillator O is set to the counter Z instead of the output signal of the measuring instrument Mg. The oscillator shown in FIG. 4 exhibits the capability of generating three different frequencies. The oscillator switches, by means of pump feedback signals from the raw material pumps P1, P2 and P3 which in each case exhibit different nominal capacities, a switch S in such a manner that its output signal in each case corresponds to the nominal capacity of the pump which happens to be connected. Purely by way of example, it is assumed that a frequency of 90 Hz at the output of the measuring instrument Mg corresponds to the maximum capacity of the pump. In the case where the frequency of the measuring instrument output does not exceed 100 Hz, the frequency comparator K does not output an output signal. The switching point of 100 Hz is adjustable and can be at different frequencies for different measuring instruments. At the logic gate "AND1", on the one hand, the measuring instrument signal is now present and, on the other hand, the negated output signal of the frequency comparator so that, therefore, both inputs of this "AND1" gate receive a signal. As a result, the output signal of this "AND1" gate is also 1. It is fed to the logic "OR" gate and from there to the counter Z.

At the same time, the oscillator 0 produces a synthetic signal, the frequency of which corresponds to the frequency of the measuring instrument output for the nominal capacity of the pump connected. This signal generated by the oscillator is supplied to the "AND2" logic gate as first input which is thus equal to 1. From the frequency comparator K, an output signal equal to 0 is present as second input at the "AND2" logic gate. The output of this logic gate is thus also at O and no signal is supplied from here to the counter Z.

If the frequency of the measuring instrument output exceeds 100 Hz and thus a distinct false measurement of this instrument is present, this measuring instrument signal is present as first input at the "AND1" logic gate so that this input is equal to a logical 1. The frequency comparator K also produces an output signal which is equal to a logical 1. Since this, however, is negated before the second input of the "AND1" gate, a 0 is present there. Thus, no signal passes from this logic gate via the "OR" gate to the counter Z. Instead, the output signal of the frequency comparator K is present at one input of the "AND2" logic gate which is thus equal to logical 1 and at the other input of this logic gate the synthesized signal of the oscillator 0 is present so that this second input is also equal to logical 1. Thus, a signal is forwarded from this "AND2" logic gate to the "OR" gate and through this to the counter Z.

Accordingly, there is no flow measurement for the time in which a heterogeneous two-phase mixture flows through the metering tube within the arrangement for mass flow measurement M since this measurement is too inaccurate. Instead, a synthesized signal is fed to the counter for analysis.

FIG. 5 shows, on the one hand, the actual measurement signal which is forwarded by the measuring instrument Mg to the comparator and, on the other hand, the signal which is produced after the correction circuit and is fed to the counter Z. In this arrangement, FIG. 5 shows the start of a metering, that is to say the time after which a raw material R has been pumped through the line L up to the arrangement for flow measurement M and is there present in the metering tube as a heterogeneous mixture together with the remaining purge gas G. In this connection, it can be seen in FIG. 5 that the measuring instrument initially emits for this switching-on process an output signal, the frequency of which is several times higher than the normal frequency corresponding to the nominal capacity of the pump. As can be seen from the comparison illustrated in FIG. 5, the "measurement signal" synthetically generated by the oscillator is supplied to the counter for this period of unbelievably high measurement values and it is only when the output signal of the measuring instrument reaches realistic values that these information items are fed to the counter.

FIG. 6 shows the same conditions in the reverse time order for the concluding phase of a metering which is followed by a purging process with the purge gas G.

A measuring error at the beginning of metering despite the correction circuit may be due to the fact that the mass flow in the metering tube, predetermined for the counter by the oscillator, does not correspond to the mass actually flowing through, since the metering tube also still exhibits residues of the purge gas G. However, the error between this ACTUAL filling of the metering tube and the NOMINAL filling of the metering tube assumed by the oscillator is much smaller than the difference between the partly several times excessive capacity specified by the measuring instrument Mg and the actual capacity. Referring to FIG. 1, it becomes clear why the correction circuit for the mass flow measurement essentially only needs to come into action during the starting phase of a metering, whereas it is not necessarily needed at the end phase of this metering. Thus valves V1, V2 or V3 are closed at a time at which the arrangement for mass flow measurement M does not yet indicate the value of raw materials R1, R2 or R3 which is to pass into the container B. This is because this apparently premature closing of the valves V1 to V3 does not yet mean the end of metering of the respective raw material since the quantity of raw material located between the valve V and the measuring arrangement M in line , L and which has not yet been measured, still passes into the container B. When the valve VG is opened and the line L is subsequently purged with the purge gas G, this residue located in line L is pressed through the measuring arrangement M into the container B and during this time a heterogeneous two-phase mixture again occurs in the measuring device. The mass located between the measuring arrangement M and the individual valves V1 to V3 in line L is a predetermined quantity of each of the individual raw materials R1 to R3 and, therefore, no longer needs to be measured by the measuring arrangement M. The second phase, in which the measuring instrument Mg supplies inaccurate values, therefore, falls into a time zone in which no measurement of the flow mass is required. The entire measuring arrangement is therefore not needed at the end of metering.

We claim:
1. An apparatus for measuring fluid flow comprising:
a measuring device operating in accordance with the Coriolis principle, including an oscillating conduit in which the fluid to be measured flows through the conduit, and a sensor for sensing the movement of the conduit and generating output signals indicative of the movement, wherein the measuring device generates a measurement signal based on the sensor signal indicative of the flow rate of fluid through the conduit, said measurement signal being pulses and the frequency of the pulses correspond to the flow rate of a fluid through the conduit;
a counting device coupled to the measuring device for receiving the measurement signal and calculating the flow rate of fluid through the conduit based on the measurement signal; and
an error-detecting device coupled to the measuring device and to the counting device for comparing the measurement signal to a threshold value, and if the measurement signal exceeds the threshold value, interrupting the transmission of the measurement signal to the counting device and transmitting a predetermined measurement signal to the counting device, wherein the error-detecting device includes a frequency comparator coupled to the measuring device for comparing the measurement signal to a threshold value, an oscillator coupled to the counting device for transmitting predetermined measurement signals to the counting device, and a logic circuit coupled to the measuring device, the oscillator, and the counting device for interrupting the transmission of the measurement signal to the counting device and transmitting a predetermined measurement signal from the oscillator to the counting device upon the frequency comparator indicating that the measurement signal exceeds a threshold value.

2. An apparatus as defined in claim 1, wherein the logic circuit includes a first AND-gate having a first input coupled to the measuring device for receiving the measurement signal and a second input coupled to the frequency comparator for receiving an inverted signal, a second AND-gate having a first input coupled to the frequency comparator for receiving an output signal therefrom and a second input coupled to the oscillator for receiving predetermined measurement signals, and an OR-gate having a first input coupled tot he first AND-gate and a second input coupled to the second AND-gate and an output coupled to the counting device for transmitting the signal of either AND-gate to the counting device.

3. An apparatus as defined in claim 1, wherein the oscillator generates a plurality of predetermined measurement signals, each predetermined measurement signal corresponding to the flow rate of a respective pump for pumping material through the conduit.

* * * * *

UNITED STATES PATENT AND TRADEMARK OFFICE
CERTIFICATE OF CORRECTION

PATENT NO. : 5,224,387

DATED : July 6, 1993

INVENTOR(S) : Lindenbaum et al.

It is certified that error appears in the above-indentified patent and that said Letters Patent is hereby corrected as shown below:

Column 6    line 3, change "tot he" to --to the--.

Signed and Sealed this

Thirty-first Day of May, 1994

*Attest:*

BRUCE LEHMAN

*Attesting Officer*     *Commissioner of Patents and Trademarks*